2,794,766
Patented June 4, 1957

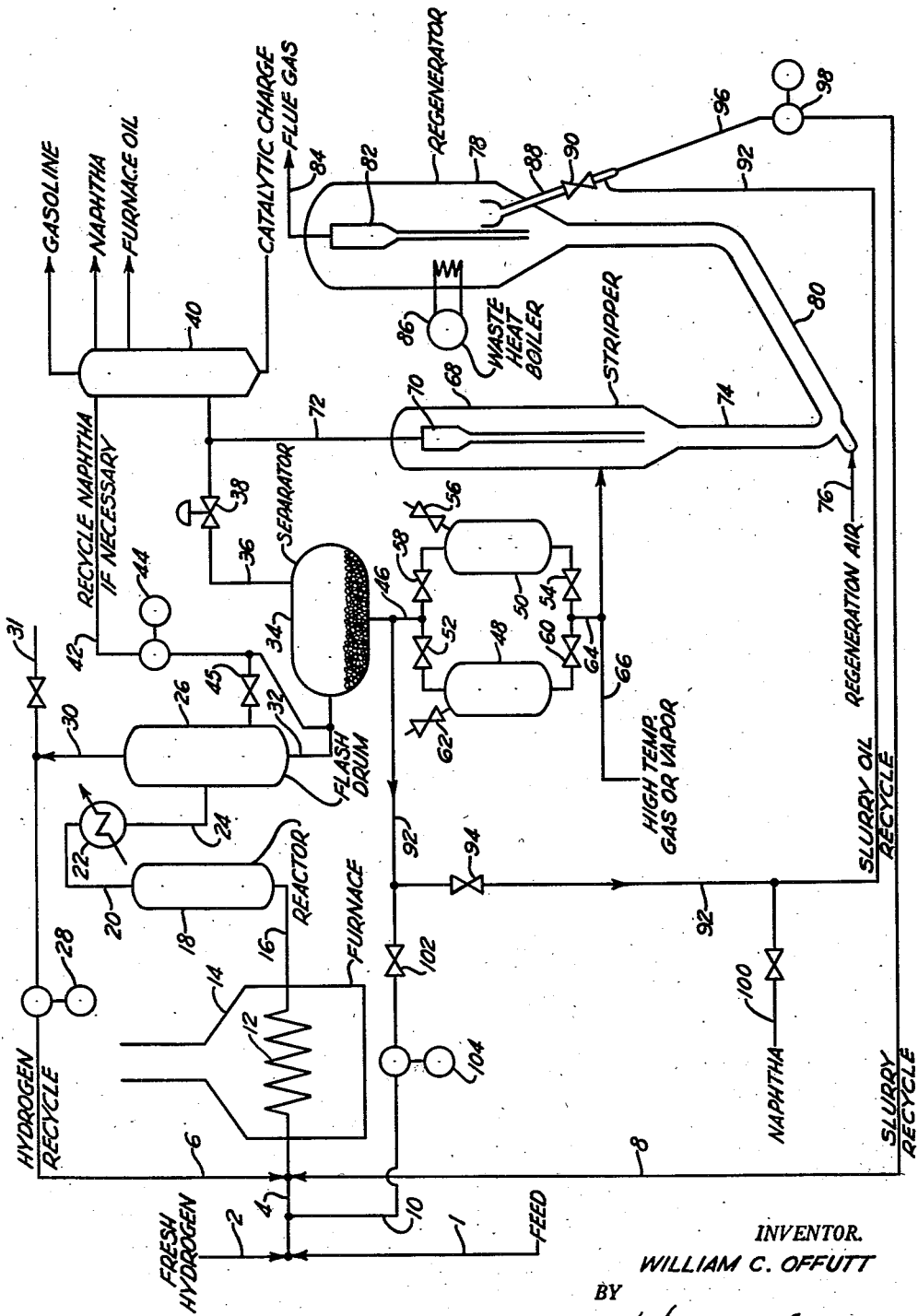

2,794,766

HYDRODESULFURIZATION PROCESS WITH SUSPENDED CATALYST AND REGENERATION OF THE CATALYST

William C. Offutt, Mount Lebanon, Pa., assignor to Gulf Research & Development Company, Pittsburgh, Pa., a corporation of Delaware Application November 8, 1954, Serial No. 467,271

4 Claims. (Cl. 196—24)

This invention relates to improved procedure for hydrodesulfurizing high boiling hydrocarbons.

It is known to subject high boiling hydrocarbons which contain sulfur compounds to treatment with hydrogen in the presence of a hydrogenation catalyst. This is usually carried out with the hydrocarbon in liquid phase or mixed liquid-vapor phase. This process has usually been carried out at very high pressures such as 3000 to 10,000 p. s. i. g. At such pressures the catalyst has a very long life perhaps running into months or years. This process has not proved to be economical mainly because of the high cost of the high pressure equipment and the high hydrogen consumption at high pressures. It has been proposed in recent years to carry out this or similar processes at relatively moderate pressures such as 200 to 1500 p. s. i. g. However, these moderate pressure processes result in considerably increased rate of coke deposition on the catalyst. This necessitates rather frequent regeneration of the catalyst to remove the coke deposited thereon. Such regeneration has been complicated and expensive or has necessitated intermittent operation due to necessity for terminating the on-stream cycle during the regeneration.

This invention has for its object to provide improved procedure for desulfurizing high boiling hydrocarbons at moderate pressures whereby the regeneration of the catalyst to remove the increased coke deposit is simplified. Another object is to provide an improved process for hydrodesulfurizing high boiling hydrocarbons while in the liquid phase or liquid-vapor phase and while in the presence of a particulate catalyst suspended therein in accordance with which the increased amount of coke deposited on the catalyst can be removed without affecting the continuity of the process. Another object is to provide a simplified continuous procedure for hydrodesulfurizing high boiling hydrocarbons at moderate pressures utilizing a finely divided catalyst suspended therein. A still further object is to improve the state of the art.

The above-noted and other objects of my invention are accomplished by passing a high boiling hydrocarbon, which contains sulfur, together with a particulate or finely divided hydrogenation catalyst and hydrogen through a reactor at a temperature between about 750° and 1000° F. at a pressure between about 200 and 1500 p. s. i. g. The high boiling hydrocarbon containing catalyst suspended therein is contacted with the hydrogen in the reactor and the reaction products including the treated hydrocarbon are substantially in liquid or mixed liquid-vapor phase while in the reactor. This mixture is removed from the reactor and the reaction products and suspended catalyst are cooled. The hydrogen is separated while at elevated pressure and at least part of it is recycled to the reactor for treatment of additional high boiling hydrocarbon. A portion of the liquid reaction products is separated under elevated pressure from the remaining liquid reaction products and the catalyst particles. This separated portion of the liquid reaction products is removed from the high pressure system and constitutes a portion of the desired desulfurized hydrocarbon product. The remainder of the reaction product and the catalyst suspended therein is at least partly removed from the high pressure system to a lower pressure. This removed mixture of catalyst and reaction products is treated to remove a substantial amount of the hydrocarbons associated with the catalyst particles. The catalyst particles then are regenerated by combustion while in a fluidized condition. This regeneration takes place at a substantially lower pressure than exists in the reactor. The regenerated catalyst is then returned to the reactor for treatment of additional high boiling hydrocarbon.

In the following examples and description I have set forth several of the preferred embodiments of my invention, but it is to be understood that they are given by way of illustration and not in limitation thereof.

The accompanying drawing is a diagrammatic elevation partly in section illustrating the manner in which the process constituting my invention may be carried out. Referring to the drawing, numeral 1 designates a conduit through which a high boiling hydrocarbon to be hydrodesulfurized is introduced into the high pressure treating system. Numeral 2 designates a conduit for introducing fresh hydrogen under pressure into the treating system. The mixture of high boiling hydrocarbon and fresh hydrogen flows through conduit 4 where it is further intermixed with recycled hydrogen introduced by way of conduit 6 and regenerated catalyst in slurry form through conduit 8. Also this mixture (in the preferred embodiment of my invention) has added to it through conduit 10 a catalyst slurry which catalyst is unregenerated. The entire mixture then flows through heating coil 12 in furnace 14 where it is heated to about reaction temperature of between 750° and 1000° F. It is preferable to heat the mixture to just below the reaction temperature which is to exist in reactor 18. The preheated mixture then flows through conduit 16 into the base of reactor 18 which is proportioned to permit the necessary residence time for the desired reaction to take place. This residence time will in general be between about 15 minutes and 2 hours (based on the liquid phase) depending upon the temperature, charge stock and pressure. A period of between ½ and 1½ hours is preferred.

The mixture in reactor 18 is in liquid phase or mixed liquid-vapor phase. The catalyst is suspended in the liquid. The hydrogen passes up through the liquid, and hydrodesulfurization and destructive hydrogenation reactions including conversion to lower boiling hydrocarbons takes place. The lighter or lower boiling portions of the charge stock will in many cases be vaporized and will pass more quickly through the reactor 18 than will the liquid portions. This is not disadvantageous since it gives a longer treating time for the more difficultly convertible higher boiling portions of the charge stock. The liquid or mixed liquid-vapor slurry flows upwardly through the reactor and together with hydrogen and vapors is removed through conduit 20 and thence flows through heat exchanger or cooler 22 and conduit 24 into flash drum 26 which is at elevated pressure. Here the reaction products are substantially entirely in liquid phase whereas the hydrogen is in gaseous phase. Separation of these two phases is accomplished in flash drum 26 and the separated hydrogen is pumped by pump 28 through conduit 30 for mixing with fresh charge stock through conduit 6. Part of the hydrogen may be bled from the system through conduit 31 to maintain the required hydrogen purity. The liquid slurry separated in flash drum 26 is removed through conduit 32 and introduced into settler 34. This settler is designed to permit the catalyst particles to settle to the lower portion of settling tank 34. It should be of such size as to permit settling of the catalyst which, of course, necessitates a minimum of turbulence. This settling takes place at elevated pressure about the same as that in the reactor except for pressure drop due to resistance to flow through the apparatus. The liquid reaction products in the upper part of settler 34 flow through conduit 36 and pressure reducing valve 38 into fractionating system 40 which operates at approximately atmospheric pressure. The reaction products are fractionated into various desulfurized cuts as indicated in the drawing. In certain cases a portion of the lighter fractions such as naphtha is recycled from the fractionating system 40 through conduit 42 by pump 44 into settler 34. Also if desired, the naphtha can be added directly into separator 26 through conduit 45.

A mixture of catalyst particles and liquid reaction product is removed from settler 34 through conduit 46. This mixture is removed from the high pressure system by means of lock hoppers 48 and 50. These lock hoppers work alternately, i. e. while one is filling, the other is emptying. Assuming that hopper 48 is being emptied, valves 52, 54 and 56 will be closed and valves 58, 60 and 62 will be open. The slurry in settler 34 then flows through valve 58 into hopper 50 under the impetus of the high pressure in settler 34. (This pressure approximates that in reactor 18.) When hopper 50 has been filled, valves 58, 60 and 62 are closed and valves 52, 54, and 56 are opened. Valve 56 is first opened to permit escape of high pressure gas from hopper 50 and this gas may be vented to the atmosphere. The slurry in hopper 50 then flows through valve 54 and conduit 64 where it is met by a stream of high temperature steam or other substantially inert gas flowing through conduit 66. The mixture of slurry and steam passes into stripper 68 which is provided with a cyclone separator 70.

The high temperature steam passes upwardly through stripper 68 and in doing so, agitates the catalyst particles so as to maintain them in a fluidized condition. This steam vaporizes most of the vaporizable hydrocarbon associated with the catalyst. The steam and vaporized hydrocarbons pass through cyclone 70 while the catalyst particles are left in a substantially dry condition, i. e. most of the associated hydrocarbon is removed therefrom. The steam and vaporized hydrocarbons then pass into conduit 72 and thence into separating system 40 where the vaporized hydrocarbons are recovered. The catalyst particles settle into conduit 74 at the base of stripper 68 and are propelled by a stream of regeneration air, introduced through conduit 76, into regenerator 78 via conduit 80. Regeneration by combustion takes place in regenerator 78 while the catalyst is in a fluidized condition. Flue gas passes through cyclone separator 82 to the flue stacks through conduit 84. Waste heat may be recovered by waste heat boiler 86. Regenerated catalyst is removed from regenerator 78 through conduit 88 at a rate controlled by valve 90.

Part of the catalyst slurry in settler 34 may be withdrawn through conduit 92 at a rate controlled by valve 94 and added to the regenerated catalyst flowing from the regenerator through conduit 88. Naphtha may be introduced into the slurry flowing through conduit 92 by means of conduit 100 in order to improve the pumpability of the mixture of slurry and regenerated catalyst in conduit 96. The mixture of regenerated catalyst and slurry from settler 34 then flows through conduit 96, pump 98 and conduit 8 into furnace 14 as previously described. It is advantageous, although not necessary, to return a portion of the catalyst and associated oil settled out in settler 34 to reactor 18. The amount of catalyst slurry recycled will depend on the type of process employed, particularly the temperature, pressure and charge stock. With high conversions, i. e. a large amount of cracking into lower boiling hydrocarbons as well as extensive desulfurization, the rate of inactivation of the catalyst is greatly increased and so also is the amount of catalyst which must be regenerated. In such a case moderate amount of or perhaps no catalyst and slurry is recycled and substantially all or all of the catalyst will be removed from the settler to the regenerator 78 for regeneration. On the other hand most charge stocks and reaction conditions will permit at least partial re-use of the catalyst before regeneration is required. In such cases recycling of most of the catalyst slurry will be advantageous and only small amounts will require regeneration to maintain the activity of the catalyst. Therefore, in most cases a major amount of the slurry contained in separator 34 will be recycled via valve 102 and pump 104 to furnace 14 and reactor 18. While the amount of recycled slurry will vary for the reasons explained above, the amount of catalyst recycled will in general be between about 0 and 8 percent by weight of the oil initially charged to the reactor 18 and the total amount of catalyst (recycle and regenerated catalyst) in the reactor will generally be between 3 and 10 weight percent of the oil charged to the reactor. This means that in the average case the catalyst can be used to treat between about 10 and 167 times its weight of oil before regeneration is required.

As indicated above, separator 34 preferably operates as a settling device for gravitational separation of the catalyst and decantation of the separated oil. However, other methods of separation such as filtration or centrifuging may be employed. One aspect of my invention involves the separation of the catalyst into what could be called a concentrate, prior to removal of the catalyst to a lower pressure. This smaller volume can be more easily removed to the lower pressure than can a large volume of catalyst and oil. Therefore, an important feature of my invention is the separation under the high pressure approximating that existing in the reactor of a large part of the reaction products from the catalyst followed by removal of a substantial portion of the separated catalyst together with some oil to a lower pressure, preferably atmospheric pressure, for regeneration. The method of separation should preferably be of such a nature that enough oil remains associated with the catalyst to form a readily flowing mixture. This mixture then can be withdrawn in much the same way as any liquid. At the same time the volume is substantially reduced so as to simplify withdrawal problems such as erosion of valves and reduction in size of necessary lock hoppers, etc. While I have illustrated my invention in connection with the use of lock hoppers 48 and 50, other means of removing the catalyst slurry may be employed such as expansion through erosion resistant valves.

The amount of hydrogen used in the process may vary between about 500 and 20,000 cubic feet per barrel of oil. Between about 2000 and 10,000 cubic feet per barrel is preferred. A large portion of this hydrogen (generally between about 1500 and 9500 cubic feet per barrel) will be recycle hydrogen which is separated and recycled as described above. The amount of fresh or make-up hydrogen should be such as to maintain the hydrogen purity above about 60 percent.

An important aspect of my invention is the regeneration of the withdrawn catalyst while it is in a fluidized condition. This enables rapid and complete regeneration of the catalyst whereas heretofore it has been customary with slurry type processes of this nature to discard or chemically rebuild the catalyst after it has become inactivated or coked. Regeneration of catalysts while they are in a fluidized condition by means of combustion gases is of course well known and my invention does not per se reside in this operation.

The process of my invention is applicable to a wide variety of high boiling charge stocks, for instance sulfur-containing crude petroleum oils may be treated. However, I prefer to first fractionate the crude to remove hydrocarbons in the lower boiling point range such as for instance gasoline, naphtha, furnace oil, etc. and to treat the reduced or topped crude. When very viscous materials are hydrodesulfurized in accordance with my invention, the separation of catalyst in separator 34 may be inadequate because of the high viscosity of the reaction products. This difficulty can be simplified or avoided by recycling a portion of the lower boiling hydrocarbons in the reaction product by way of conduit 42 and pump 44. It is to be noted that this will be required infrequently because normal operation of my process involves settling in the presence of the light portion of the reaction products and this light portion usually suffices to expedite the settling operation.

The temperatures employed in reactor 18 may be between 750° and 1000° F. Temperatures of between 800° and 900° F. are preferred. The pressure in reactor 18 may be between about 200 and 1500 p. s. i. g. Pressures of about 500 to 1000 p. s. i. g. are preferred. The steam or other stripping gas such as carbon dioxide used to remove hydrocarbons in stripper 68 should have a temperature of about 800° to 1000° F. depending upon the heat of vaporization and absorption properties of the reaction products. The process when carried out in the manner described above results not only in a removal of most of the sulfur contained in the charge stock but also in some conversion into lower boiling hydrocarbons. The extent of the conversion depends upon the reaction conditions selected. Lower portions of the temperature range indicated will result in less conversion to lower boiling hydrocarbons. Also charge stocks vary considerably in regard to their tendency to crack into lower boiling materials.

Numerous catalysts suitable for hydrodesulfurizing hydrocarbons are disclosed in the prior art and all such catalysts can be used in accordance with my invention. Examples of suitable catalysts are nickel, cobalt, iron, tungsten, molybdenum, chromium, etc. oxides and sulfides. I prefer to employ a combination of the oxides or sulfides of iron group metals with oxides or sulfides of group VI, left-hand column of the periodic table. Examples of such combined oxide catalysts are nickel tungstate and nickel or cobalt molybdate. The catalyst is preferably deposited upon a porous carrier such as activated alumina, alumina stabilized with a small amount of silica, silica-alumina cracking catalysts, etc. Deposition on the carrier not only increases the activity of the catalyst but simplifies fluidization during regeneration.

EXAMPLE

A reduced crude derived from Kuwait crude and having the characteristics shown in Table I is mixed with hydrogen [1] in an amount of 10,000 cubic feet per barrel and with 5 percent by weight of charge of a finely divided catalyst comprising 10 percent by weight of nickel tungstate deposited upon activated alumina. This mixture is passed through a preheating furnace and is preheated to a temperature of 800° F. The preheated mixture is then passed into the base of the reactor and flows upwardly through the reactor in which the temperature is maintained at 850° F. and the pressure 1000 p. s. i. g. The reaction products, hydrogen and catalyst are removed from the top of the reactor, cooled to 60° F. and the hydrogen is separated and recycled for treatment of fresh reduced crude. The liquid portion of the reaction product and catalyst particles are settled in a settling chamber at approximately reaction pressure. 85 volume percent of the liquid substantially free of solid matter is removed from the top of the settler and is expanded to substantially atmospheric pressure and subjected to distillation. Distillation analysis of this product is given in Table II. A slurry concentrate of catalyst and liquid reaction product constituting all of the catalyst and 15 volume percent of the liquid product is removed from the base of the settler. Eighty parts of this slurry concentrate are recycled to the reactor. Twenty parts of the settled slurry concentrate are expanded to substantially atmospheric pressure by passage through a lock hopper. This concentrate is treated with steam at a temperature of 850° F. and is then subjected to regeneration while in a fluidized condition at a temperature of 1100° F. and at substantially atmospheric pressure. 1 part of regenerated catalyst and 100 parts of fresh charge stock are mixed and introduced into the reactor.

*Table I*

| | |
|---|---|
| Gravity: °API (D–287) | 5.8 |
| Viscosity, SUV at 210° F.: seconds (D–88) | 10,346 |
| Pour point: °F. (D–97) | >115 |
| Color, ASTM union (D–155) | 8+D |
| Sulfur: percent (D–129) | 5.45 |
| Water and sediment: percent (D–96) | 0.4 |
| Carbon residue, Conradson: percent (D–189) | 19.8 |

*Table II*

| | |
|---|---|
| Gravity, °API (D–287) | 13.5 |
| Sulfur, percent (D–129) | 2.75 |
| True boiling point distillation: | |
| IBP-400° F.: percent by volume | 11.5 |
| 400°–670° F.: percent by volume | 18.9 |
| 670°–1030° F.: percent by volume | 33.6 |
| 1030° F.+: percent by volume | 36.0 |

I claim:

1. The process for hydrodesulfurizing a high boiling hydrocarbon which comprises passing the high boiling hydrocarbon substantially in liquid phase together with hydrogen and a finely divided hydrogenation catalyst through a reactor at a temperature between about 750° and 1000° F. and at a pressure between about 200 and 1500 p. s. i. g., removing a stream of liquid and vapor reaction products, catalyst and hydrogen from the reactor, cooling the reaction products, catalyst and hydrogen, separating hydrogen from the reaction products at elevated pressure, recycling at least part of the separated hydrogen, separating catalyst from most of the reaction products, said separation taking place at substantially the reaction pressure and being incomplete so that a portion of the liquid reaction products remains in contact with the separated catalyst to form a concentrate of catalyst in hydrocarbon liquid, removing at least part of the concentrate of catalyst and accompanying liquid hydrocarbon from the high pressure system, removing the separated reaction products from the high pressure system and subjecting them to distillation, treating the removed portion of the concentrate to separate a substantial amount of the accompanying liquid hydrocarbon from the catalyst particles, introducing the catalyst particles into a regenerator, regenerating the catalyst therein by combustion while the catalyst particles are fluidized, i. e. while the catalyst particles are suspended in regeneration gases, and returning regenerated catalyst into contact with fresh high boiling hydrocarbon and hydrogen under the above-designated reaction conditions.

2. The process for hydrodesulfurizing a high boiling hydrocarbon which comprises passing the high boiling hydrocarbon substantially in liquid phase together with hydrogen and a finely divided hydrogenation catalyst through a reactor at a temperature between about 750° and 1000° F. and at a pressure between about 200 and 1500 p. s. i. g., removing a stream of liquid and vapor reaction products, catalyst and hydrogen from the reactor, cooling the reaction products, catalyst and hydrogen, separating hydrogen from the reaction products at elevated pressure, recycling at least part of the separated hydrogen, separating catalyst from most of the reaction products, said separation taking place at substantially the reaction pressure and being incomplete so that a portion of the liquid reaction products remains in contact with the separated catalyst to form a concentrate of catalyst in hydrocarbon liquid, removing at

---

[1] This is a recycle gas having a 75 percent hydrogen content.

least part of the concentrate of catalyst and accompanying liquid hydrocarbon from the high pressure system, removing the separated reaction products from the high pressure system and subjecting them to distillation, treating the removed portion of the concentrate with steam to separate a substantial amount of the accompanying liquid hydrocarbon from the catalyst particles, introducing the catalyst particles into a regenerator, regenerating the catalyst therein by combustion while the catalyst particles are fluidized, i. e. while the catalyst particles are suspended in regeneration gases, and returning regenerated catalyst into contact with fresh high boiling hydrocarbon and hydrogen under the above-designated reaction conditions.

3. The process for hydrodesulfurizing a high boiling hydrocarbon which comprises passing the high boiling hydrocarbon substantially in liquid phase together with hydrogen and a finely divided hydrogenation catalyst through a reactor at a temperature between about 750° and 1000° F. and at a pressure between about 200 and 1500 p. s. i. g., removing a stream of liquid and vapor reaction products, catalyst and hydrogen from the reactor, cooling the reaction products, catalyst, and hydrogen, separating hydrogen from the reaction products at elevated pressure, recycling at least part of the separated hydrogen, separating catalyst from most of the reaction products, said separation taking place at substantially the reaction pressure, being incomplete so that a portion of the liquid reaction products remains in contact with the separated catalyst to form a concentrate of catalyst in hydrocarbon liquid, and being accomplished by settling the catalyst and decanting part of the liquid reaction products, removing at least part of the concentrate of catalyst and accompanying liquid hydrocarbon from the high pressure system, removing the separated reaction products from the high pressure system and subjecting them to distillation, treating the removed portion of the concentrate to separate a substantial amount of the accompanying liquid hydrocarbon from the catalyst particles, introducing the catalyst particles into a regenerator, regenerating the catalyst therein by combustion while the catalyst particles are fluidized, i. e. while the catalyst particles are suspended in regeneration gases, and returning regenerated catalyst into contact with fresh high boiling hydrocarbon and hydrogen under the above-designated reaction conditions.

4. The process for hydrodesulfurizing a high boiling hydrocarbon which comprises passing the high boiling hydrocarbon substantially in liquid phase together with hydrogen and a finely divided hydrogenation catalyst through a reactor at a temperature between about 750° and 1000° F. and at a pressure between about 200 and 1500 p. s. i. g., removing a stream of liquid and vapor reaction products, catalyst and hydrogen from the reactor, cooling the reaction products, catalyst and hydrogen to a temperature substantially lower than the temperature in the reactor, separating hydrogen from the reaction products at elevated pressure, recycling at least part of the separated hydrogen, separating catalyst from most of the reaction products, said separation taking place at substantially the reaction pressure and being incomplete so that a portion of the liquid reaction products remains in contact with the separated catalyst to form a concentrate of catalyst in hydrocarbon liquid and being accomplished by settling the catalyst and decanting part of the liquid reaction products, removing at least part of the concentrate of catalyst and accompanying liquid hydrocarbon from the high pressure system, removing the separated reaction products from the high pressure system and subjecting them to distillation, treating the removed portion of the concentrate to separate a substantial amount of the accompanying liquid hydrocarbon from the catalyst particles, introducing the catalyst particles into a regenerator, regenerating the catalyst therein by combustion while the catalyst particles are fluidized, i. e. while the catalyst particles are suspended in regeneration gases, and returning regenerated catalyst into contact with fresh high boiling hydrocarbon and hydrogen under the above-designated reaction conditions.

References Cited in the file of this patent
UNITED STATES PATENTS

| | | |
|---|---|---|
| 2,617,709 | Cornell | Nov. 11, 1952 |
| 2,695,866 | McGrath | Nov. 30, 1954 |
| 2,700,015 | Joyce | Jan. 18, 1955 |
| 2,706,167 | Harper et al. | Apr. 12, 1955 |